United States Patent
Wyatt et al.

(10) Patent No.: US 9,847,891 B2
(45) Date of Patent: Dec. 19, 2017

(54) SYSTEM AND METHOD FOR DETECTING REUSE OF AN EXISTING KNOWN HIGH-SPEED SERIAL INTERCONNECT LINK

(75) Inventors: David Wyatt, San Jose, CA (US); Vishal Mehta, San Jose, CA (US); Michael Hopgood, San Jose, CA (US); Mark Taylor, Mountain View, CA (US); Hitendra Dutt, Sunnyvale, CA (US); Samuel Vincent, Tracy, CA (US); Wei-Je Huang, Fremont, CA (US)

(73) Assignee: Nvidia Corporation, Santa Clara, CA (US)

( * ) Notice: Subject to any disclaimer, the term of this patent is extended or adjusted under 35 U.S.C. 154(b) by 247 days.

(21) Appl. No.: 13/217,057

(22) Filed: Aug. 24, 2011

(65) Prior Publication Data

US 2013/0051483 A1    Feb. 28, 2013

(51) Int. Cl.
*H04L 27/00* (2006.01)
*H04L 25/03* (2006.01)

(52) U.S. Cl.
CPC .......... *H04L 25/03885* (2013.01); *H04L 2025/03783* (2013.01)

(58) Field of Classification Search
None
See application file for complete search history.

(56) References Cited

U.S. PATENT DOCUMENTS

| | | | |
|---|---|---|---|
| 4,621,366 A * | 11/1986 | Cain et al. | ..................... 375/222 |
| 6,697,336 B1 * | 2/2004 | Socher | ......................... 370/252 |
| 7,136,953 B1 | 11/2006 | Bisson | |
| 7,461,195 B1 | 12/2008 | Woodral | |
| 7,539,809 B2 | 5/2009 | Juenger | |
| 7,715,323 B2 | 5/2010 | Connolly et al. | |
| 7,757,020 B2 | 7/2010 | Sharma et al. | |
| 7,853,731 B1 * | 12/2010 | Zeng | ............................... 710/18 |
| 7,996,591 B2 | 8/2011 | Xie et al. | |
| 8,059,673 B2 | 11/2011 | Kobayashi | |
| 8,275,922 B2 | 9/2012 | Barrett et al. | |
| 8,301,813 B2 | 10/2012 | Barbiero | |
| 8,483,108 B2 | 7/2013 | Whitby-Strevens | |

(Continued)

OTHER PUBLICATIONS

PCI SIG Debugging PCI Express 3.0 Link Problems—Dated Jun. 22, 2011; 50 Pages.

*Primary Examiner* — Ernest Unelus
*Assistant Examiner* — Dayton Lewis-Taylor (57) ABSTRACT

In a system according to one embodiment of the present disclosure, the system comprises a first device, a second device, a communications link, and a memory. The memory stores instructions that when executed by the system perform a method of communications link training. This method comprises requesting a speed change to a second speed for the first device communicating with the second device at a first speed via the communications link. A saved set of parameters are accessed for at least one of the first device and the second device. A first training cycle is performed for the first device and the second device at the second speed using the saved set of parameters for the at least one of the first device and second device. The reuse of parameters from a previous successful equalization training cycle reduces the time required to perform equalization training.

17 Claims, 5 Drawing Sheets

(56) References Cited

U.S. PATENT DOCUMENTS

| | | |
|---|---|---|
| 8,503,474 B2 | 8/2013 | Diab et al. |
| 8,599,913 B1 | 12/2013 | Brown et al. |
| 2003/0189977 A1* | 10/2003 | Sweitzer et al. .............. 375/222 |
| 2004/0213361 A1* | 10/2004 | Chen et al. ................... 375/340 |
| 2005/0251595 A1* | 11/2005 | Lesartre ......................... 710/71 |
| 2005/0270988 A1* | 12/2005 | DeHaemer ............... H04L 5/18 370/254 |
| 2006/0114918 A1* | 6/2006 | Ikeda et al. .................. 370/408 |
| 2012/0047260 A1 | 2/2012 | Patel |

* cited by examiner

SYSTEM AND METHOD FOR DETECTING REUSE OF AN EXISTING KNOWN HIGH-SPEED SERIAL INTERCONNECT LINK

CROSS-REFERENCES TO RELATED APPLICATIONS

This Application is related to the commonly assigned U.S. Pat. No. 8,949,497, filed Sep. 12, 2011.

TECHNICAL FIELD

The present disclosure relates generally to the field of high-speed serial interconnect links and more specifically to the field of communications link equalization training.

BACKGROUND

Figure 1:
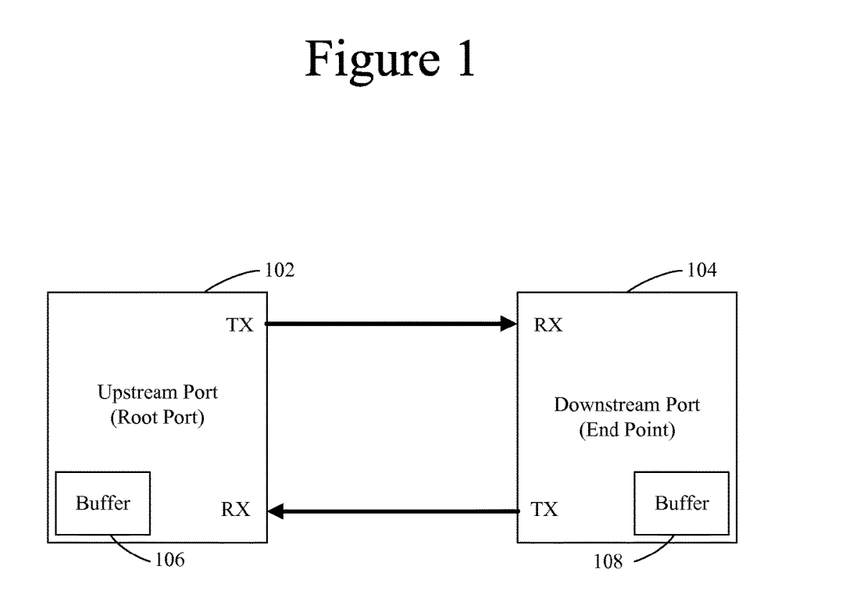
FIG. 1 illustrates a simplified schematic diagram of two devices interconnected by a PCIe link according to the prior art.

Peripheral Component Interconnect Express (PCIe) is a high-speed serial interconnect bus standard, as established by the PCI SIG (PCI Special Interest Group). The PCIe bus can be used in computer hardware as a motherboard-level interconnect or as an expansion card interface. A motherboard-level interconnect links together motherboard mounted peripherals, while an expansion card interface is used by peripherals (e.g., a video card) that fit into the motherboard's expansion slots. In one embodiment, as illustrated in FIG. 1, an upstream port or rootport 102 is connected to a downstream port or endpoint 104.

PCIe Generation 3.0 (PCIe Gen3) is the latest PCIe standard with increased interconnect link speeds, but with accompanying increased link equalization training time requirements. PCIe link equalization training is the process whereby a connected rootport 102 and endpoint 104 select parameters that ensure a favorable bus bit error rate (BER) when transmitting and receiving traffic over the PCIe interconnect link at higher speeds. The challenge with existing PCIe link equalization training processes is that under normal circumstances such equalization training can be very lengthy (e.g. 100 ms). During such a training interval, the bus being unavailable, data will not be transmitted across the bus. Attempts to send data during such link equalization training times will either fail with a completion timeout (e.g. returning 0xFF's) or be held-off within the sending PCIe device 102, 104 until the training is complete.

In many system designs a peripheral or mezzanine bus may be a critical component for system operation, hence a long period of unavailability may compromise operating system robustness, or result in the loss of data. For example, a common rule of thumb for system BIOS code inside a System Management Mode (SMM) handler is never to exceed a 0.5 ms delay, however if such code was to access a PCIe device during a retraining (re-equalization) and thus be held up for 0.5 ms or longer, the operating system software would trigger an error message or lock-up, or can lead to data corruption or a system crash.

One solution is to attempt to constrain equalization training sequences to system boot times (e.g. before the operating system loads). However, should the original link be lost and a new link with parameters be required, an equalization training sequence or training arc will be required to be performed outside of the initial boot sequence. Such out of initial boot sequence equalization retraining can result in problems for devices connected to the effected PCIe link that are sensitive to the quantity of down-time required for equalization training or retraining.

SUMMARY OF THE INVENTION

Embodiments of the present invention provide a solution to the challenges inherent in equalization training for PCIe communication links when the equalization training occurs outside of the initial boot sequence. Embodiments of the invention reduce the time required to complete PCIe link equalization training by reusing parameters from a previous equalization training cycle. By saving and reusing the optimal parameter coefficients from a previous successful equalization training cycle, equalization training can be performed without a computer system or user noticing. Reuse of previously determined optimal parameters reduces the time required for equalization training by avoiding the time-intensive search for optimal parameters out of a plurality of available parameters.

In a system according to one embodiment of the present disclosure, the system comprises a first device, a second device, a communications link, and a memory. The memory stores instructions that when executed by the system perform a method of communications link training. This method comprises requesting a speed change to a second speed for the first device communicating with the second device at a first speed via the communications link. A saved set of parameters are accessed for at least one of the first device and the second device. A first training cycle is performed for the first device and the second device at the second speed using the saved set of parameters for the at least one of the first device and second device. The reuse of parameters from a previous successful equalization training cycle reduces the time required to perform equalization training.

In a method according to one embodiment of the present invention, a method for communications link training is disclosed. A communications link training method comprises: requesting a speed change to a second speed for a first device communicating with a second device at a first speed via the communications link. A saved set of parameters are accessed for at least one of the first device and the second device. Finally, a first training cycle is performed for the first device and the second device at the second speed using the saved set of parameters for the at least one of the first device and second device. The reuse of parameters from a previous successful equalization training cycle reduces the time required to perform equalization training.

BRIEF DESCRIPTION OF THE DRAWINGS

The present invention will be better understood from a reading of the following detailed description, taken in conjunction with the accompanying drawing figures in which like reference characters designate like elements and in which.

DETAILED DESCRIPTION

Reference will now be made in detail to the preferred embodiments of the present invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of embodiments of the present invention, numerous specific details are set forth in order to provide a thorough understanding of the present invention. However, it will be recognized by one of ordinary skill in the art that the present invention may be practiced without these specific details. In other instances, well-known methods, procedures, components, and circuits have not been described in detail so as not to unnecessarily obscure aspects of the embodiments of the present invention. The drawings showing embodiments of the invention are semi-diagrammatic and not to scale and, particularly, some of the dimensions are for the clarity of presentation and are shown exaggerated in the drawing Figures. Similarly, although the views in the drawings for the ease of description generally show similar orientations, this depiction in the Figures is arbitrary for the most part. Generally, the invention can be operated in any orientation.

Notation and Nomenclature:

Some portions of the detailed descriptions, which follow, are presented in terms of procedures, steps, logic blocks, processing, and other symbolic representations of operations on data bits within a computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "accessing" or "executing" or "storing" or "rendering" or the like, refer to the action and processes of a computer system, or similar electronic computing device, that manipulates and transforms data represented as physical (electronic) quantities within the computer system's registers and memories and other computer readable media into other data similarly represented as physical quantities within the computer system memories or registers or other such information storage, transmission or display devices. When a component appears in several embodiments, the use of the same reference numeral signifies that the component is the same component as illustrated in the original embodiment.

Communications Link Equalization Training:

This present disclosure provides a solution to the increasing challenges inherent in dealing with the time required for equalization training of PCIe links when such equalization training occurs outside of the initial boot sequence. Various embodiments of the present disclosure provide processes and apparatus for fast link training. As discussed in detail below, when a rootport 102 and an endpoint 104 communicating via a PCIe link request a speed change (e.g. from PCIe Gen1 or Gen2 to PCIe Gen3), an equalization training cycle is performed. If this rootport 102 and endpoint 104 have previously been through an equalization training cycle at the requested speed (PCIe Gen3), saved parameters from the previous equalization training cycle can be used in the current equalization training cycle. Such reuse of previously determined optimal parameters can avoid the time-intensive search for optimal parameters during the current equalization training cycle.

In this fast training process a system basic input/output system (System BIOS) recognizes a recurrence of the same endpoint 104 as having been previously successfully trained with the rootport 102, and that the rootport 102 and endpoint 104 have fast link training capabilities. Upon confirming these conditions, the System BIOS can then bypass traditional phases of equalization training and directly reuse previously saved parameter settings. The System BIOS may also signal to the endpoint 104 that the rootport 102 has confirmed conditions are favorable to permit fast training. Such use of previous parameters allows the equalization training to begin with the last known optimal parameter coefficients as a starting point, thereby reducing the time required to complete equalization training.

Figure 2A:
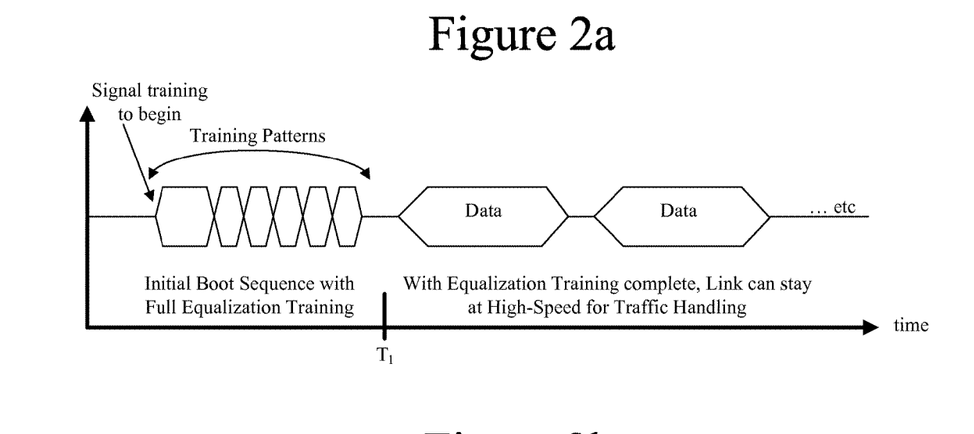
FIG. 2a illustrates an exemplary flow-chart for performing equalization training of two interconnected devices on a PCIe link in accordance with an embodiment of the present invention.

As illustrated in FIG. 2a, the first equalization training for PCIe link ports 102, 104 usually occurs during an initial boot sequence when the computer system is first powered on. During this initial boot sequence, the computer system will not be affected when the PCIe link is idle during the equalization training During this initial boot sequence, as illustrated in FIG. 2a, there is at least one inactivity timer that establishes when the system (e.g. a rootport device) can communicate with an endpoint device. In one exemplary embodiment, $T_1$ is at least 100 ms. Equalization training (including equalization training at PCIe Gen3 speeds) can usually be completed before the inactivity timer finishes at $T_1$. However, for an exemplary computer system with a more complicated or longer link runs, equalization training may not complete during the initial boot sequence inactivity time T1. There may also be reasons why PCIe Gen3 equalization training is not performed during the first or initial boot of the system, or as further illustrated in FIG. 2b, why the PCIe Gen3 equalization training may need to be repeated or performed at a later time $T_2$. As noted above, PCIe Gen1/Gen2 equalization training can be completed rapidly enough that there is little down-time and the rootport 102 and endpoint 104 device buffers 106, 108 are normally sufficient to prevent the system or user from noticing the time that the PCIe link was idle for training at PCIe Gen1/Gen2 speeds.

Figure 2B:
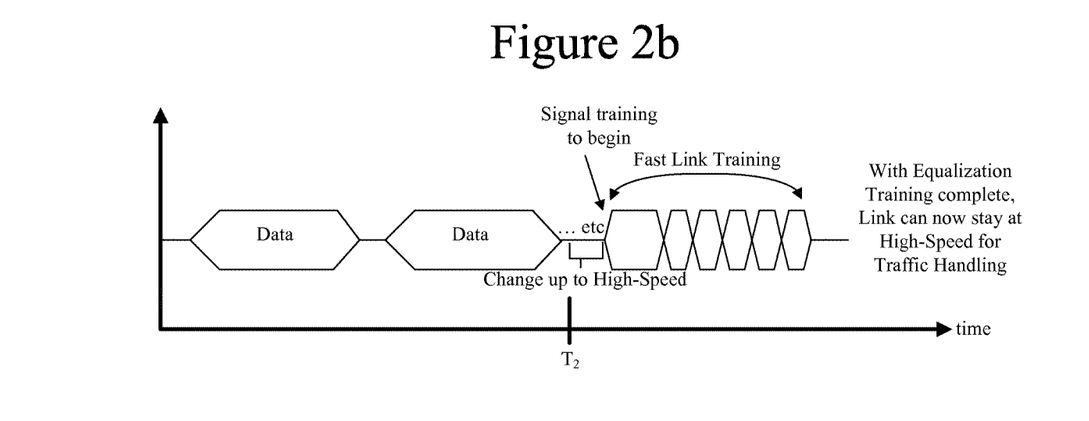
FIG. 2b illustrates an exemplary flow-chart for performing equalization training of two interconnected devices on a PCIe link in accordance with an embodiment of the present invention.

As noted above, computer systems generally only boot once during a particular operating period before powering down, and require a new boot sequence the next time the system is started. However, there are computer systems that do not follow the single boot concept. The computer system may perform an initial boot (with the PCIe link entering Gen 3 after the required equalization training) and then due to power management controls, a graphics processing unit (GPU) can be powered down and then as illustrated in FIG. 2b, subsequently restarted with the required equalization training cycle. In other words, while the rest of the computer system may still be powered up, the PCIe linked device, such as a GPU, can be powered down alone. Powering down the GPU will terminate the PCIe link to the GPU, which will have to be re-established once the GPU is powered back up. This second equalization training when the PCIe link is re-established, as illustrated in FIG. 2b, will be performed outside the system boot sequence. As discussed below, FIG. 2b illustrates an exemplary process for equalization training that utilizes previous parameter coefficients when available.

The GPU can be periodically powered down through aggressive power management. For example, should there be a particular system environment where the GPU is not needed, the GPU can be powered down. In other words, the GPU can be idled back or shut completely down, allowing the PCIe link to be terminated. Therefore, shutting down the GPU can be done in stages: from completely powering the GPU down to only idling certain processing functions. As power management will likely remain a design consideration, other opportunities to further conserve power in the future may be desired or required.

Figure 3:
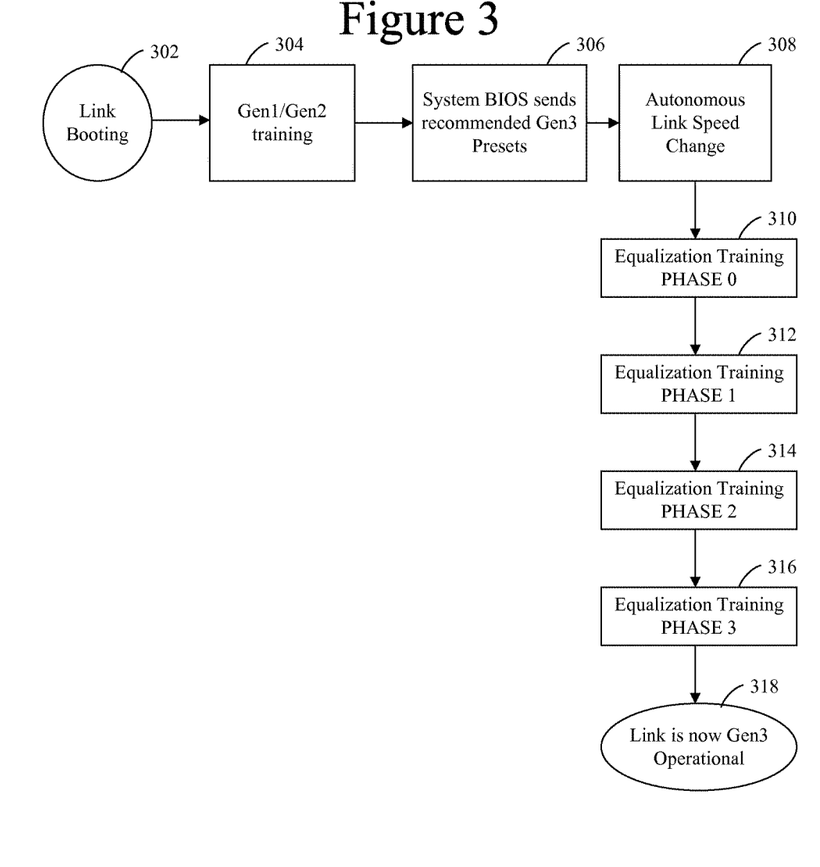
FIG. 3 illustrates an exemplary flow-chart for performing equalization training of two interconnected devices on a PCIe link in accordance with an embodiment of the present invention.
Figure 4:
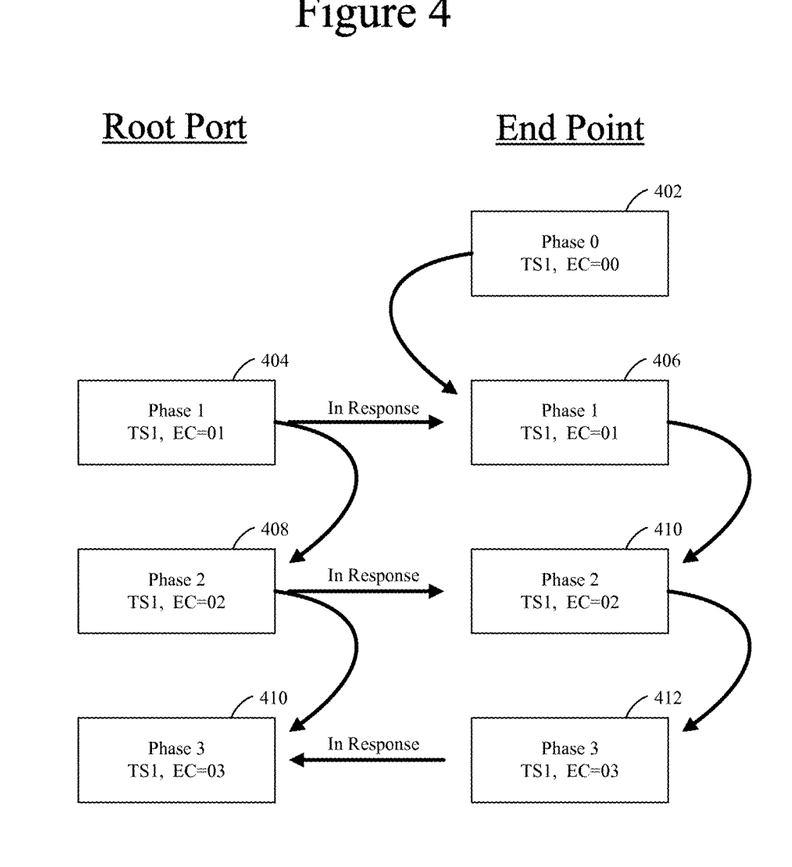
FIG. 4 illustrates an exemplary flow-chart for performing equalization training of two interconnected devices on a PCIe link in accordance with an embodiment of the present invention.

Conventional Equalization Training:

FIGS. 3 and 4 illustrate the exemplary phases of equalization training as performed by the rootport 102 transmitter (TX) and receiver (RX) and the endpoint 104 transmitter (TX) and receiver (RX) illustrated in FIG. 1. These equalization training phases (Phase 0 through Phase 3), as illustrated in FIGS. 3 and 4, are used for full autonomous equalization training cycles, but may also be used during Fast Link Training, as discussed in detail below. A full autonomous equalization training cycle is also discussed in commonly assigned U.S. Pat. No. 8.949.497, filed on Sep. 12, 2011, titled "METHOD AND APPARATUS FOR INTERLEAVING BURSTS OF HIGH-SPEED SERIAL INTERCONNECT LINK TRAINING WITH BUS DATA TRANSACTIONS," by Hopgood et al., which is hereby incorporated by reference herein.

As discussed above and below, in the phases of equalization training, the optimum combination of parameters are determined that result in the highest transmission quality (e.g. an acceptable BER). Such equalization training is required to transmit and receive traffic in PCIe Gen1, as well as when transitioning from PCIe Gen1 to PCIe Gen2 and even more so when transitioning to PCIe Gen3. As discussed below, while the equalization training for PCIe Gen1 or Gen2 can be completed quickly and unnoticed by the system, transitioning to the higher communication speeds provided by PCIe Gen 3 requires an equalization training arc that can become quite time intensive.

As illustrated in FIG. 3, in step 302, a PCIe communications link is booted. In step 304 PCIe Gen1/Gen2 equalization training is completed. In step 306, before PCIe Gen3 speeds are entered, the ports 102, 104 exchange basic information at Gen1 or Gen2 speeds to tell the rootport 102 and endpoint 104 what the recommended starting points (presets) for PCIe Gen3 would be. The rootport 102 sends a training set to the endpoint 104 device and within the training set is a selection of a particular set of presets (standard, identified, collection of transmitter parameters). There are several parameters, for example: precursor, maincursor, and postcursor. Further, in one embodiment, there are 11 basic combinations of parameters available.

However, these pre-selected settings (e.g. the presets) may not be ideal. Further, because of the large range of devices that are possible, while one selection of settings may be optimal for one particular pair of devices, they will be wrong for another pair of devices (even if they should be the same type of devices made by the same manufacturer(s)). In one embodiment, further parameter combinations can be selected, apart from the preset selections that will be more optimal than the preset selection of parameters. There may also be situations where equalization training can be improved upon by using a custom arrangement for a particular set of port devices, such that starting settings are designed to be closer to an optimal set right from the start, rather than starting from generic parameters. Being able to start with a set of parameters that are "pretty good" for a given pair of devices means that the equalization training time may be reduced, allowing for faster equalization training to take place.

Having exchanged the recommended PCIe Gen3 presets, in step 308, the communications link speed is changed to the higher speed Gen3. Finally, as illustrated in steps 310-316, equalization training is performed. As discussed in detail by Hopgood, the four phases of equalization training allow the endpoint 104 to direct the rootport 102 to cycle through a particular selection of parameter sets that may be individually evaluated to determine an optimal set of parameters for the rootport. The rootport 102 will also direct the endpoint 104 to cycle through a particular selection of parameter sets that are individually evaluated to determine an optimal set of parameters for the endpoint 104. In step 318, having completed equalization training, the PCIe communications link is ready for Gen3 speeds.

As illustrated in FIG. 4, four different phases are performed during equalization training: 0, 1, 2, and 3. During each of these Phases, training sets (TS1s) are sent. Inside each of the training sets are identifying characteristics to define what phase each device is running at. To begin equalization training, as illustrated in FIG. 4, block 402, the rootport 102 enters Phase 1 (EC=01). The training set (TS1) for the rootport 102 indicates that it is now in training Phase 1. The rootport 102 enters directly into this Phase and sets its TS1 to Phase 1 to show the endpoint 104 that it is entering Phase 1.

Meanwhile, as illustrated in block 404, the endpoint 104 starts out by entering Phase 0 (EC=00). A purpose of Phase 0 is to make sure that the two devices 102, 104 can synchronize with each other before they start training. This ensures that both devices 102, 104 are at the same phase or point in training before training continues. Once the endpoint 104 detects that the rootport 102 is in Phase 1 and is sending data that it can partially see, the endpoint 104, as illustrated in block 406, will also enter Phase 1 (EC=01). Because there has not been any training yet, the received data during Phases 0 and 1 will not be completely clean (in other words, a receiver will receive only some of the data, with a lot of the data lost) until the equalization training finishes. While received data is not clean enough for transmitting traffic, it can be sufficient to allow the equalization training to be performed. Once both the rootport 102 and the endpoint 104 are in Phase 1 (EC=01), the equalization training will have entered Phase 1 of the training sequence (that is, both devices are synchronized at Phase 1). It can be known that both ports are at Phase 1 when the endpoint 104 is at Phase 1 because the endpoint 104 will not enter Phase 1 until the rootport 102 has announced to the endpoint 104 that it is in Phase 1.

As illustrated in blocks 408 and 410, now that both devices 102, 104 are in Phase 1, the endpoint 104 and the rootport 102 will now transition to Phase 2 (EC=02 for both ports). At this time the endpoint 104 device has taken control of the PCIe link and attempts to evaluate the data coming back to it. In an exemplary embodiment, during Phase 2, the equalization training cycle is training the rootport 102 transmitter to the endpoint 104 receiver. The endpoint 102 transmitter is used to instruct the rootport 102 transmitter what parameter settings to select. As discussed above, in setting up the parameters, either a series of presets can be selected, or detailed parameters can be individually selected. The detailed parameters allow for finer adjustments, although, the first parameters selected may be presets. After receiving the desired parameters from the endpoint 104 (as contained in the training set), the rootport's 102 transmitted signal is evaluated by the endpoint 104. If the endpoint 104 determines that the quality of the received signal does not meet a metric, different parameter settings can be selected through the endpoint 104 training set that is transmitted to the rootport 102 to select different parameter settings. In other words, the root port 102 transmitter sends data to the endpoint 104 receiver and the end point 104 evaluates the quality of the signal and if the quality is not sufficient, the end point 104 transmitter requests different parameter settings by transmitting the request to the root point 102 receiver, wherein the root port 102 changes settings and transmits again to the endpoint 104. This circular process continues until the receiver determines that the data received is acceptable (that it meets the established metrics). Once the endpoint determines that the received data quality meets prescribed metrics, Phase 2 finishes.

In blocks 410 and 412 of FIG. 4, the equalization training cycle has progressed to Phase 3 (EC=03 for both ports) and is now training the endpoint 104 transmitter to the rootport 102 receiver. In Phase 3 the endpoint 104 transmitter sends data to the rootport 102 receiver, and the rootport 102 evaluates the quality of the transmitted signal. If the quality of the received signal is not sufficient, the rootport 102 transmitter requests different settings by transmitting the request to the endpoint 104 receiver. The endpoint 104 transmitter changes parameter setting as requested by the rootport 102 and transmits again to the rootport 102 receiver for further analysis.

In Phases 2 and 3 of an exemplary embodiment, contained within the transmitted data, the transmitting device can acknowledge whether or not it was able to accept those requested setting changes. If parameter changes are requested that a device cannot handle, the requested device will respond and signify that the requested device cannot change to the desired settings. Otherwise, the requested device will respond that it was able to change to the requested settings.

Fast Link Training:

In various embodiments, Fast Link Training is equalization training for a rootport 102 and endpoint 104 on a PCIe link where optimal parameter coefficients from a previous equalization training cycle are re-used instead of searching for new optimal parameter sets. By starting with previously known optimal parameter coefficients instead of searching for a new optimal set of parameters from a plurality of available parameter settings, the time required for establishing a PCIe Gen3 connection speed (e.g. completing equalization training at Gen3 speeds) can be greatly reduced such that the PCIe link can be dropped and restarted (with the required equalization re-training) without computer system or user notice.

Conventionally, during PCIe Gen1/Gen1 operation, either the rootport 102 or the endpoint 104 will request a speed change (e.g. PCIe Gen3 link speeds). Ordinarily, the rootport 102 and endpoint 104 would send a selected group of presets and then perform the speed change after the rootport 102 and endpoint 104 enter receiver lock using the above described presets at Gen 3. From here equalization training can begin so that the rootport 102 and endpoint 104 are able to communicate with each other at an acceptable data bit error rate (BER). The above procedure will be performed the first time the rootport 102 and endpoint 104 enter Gen 3. If for some reason the rootport 102 and endpoint 104 leave Gen 3 speeds and return to Gen1/Gen2 speeds and then request a return to Gen3 speeds, equalization training is not required the second time, as the optimal coefficients are already in place in both the rootport 102 and endpoint 104.

Embodiments of the invention utilizing fast link training start with a rootport 102 and endpoint 104 that are capable of performing fast link training, have gone through equalization training at least once with each other, and contain the required flags and/or register bits indicating that the rootport 102 and endpoint 104 know each other (e.g. that they recognize each other and have previously trained together). A register or other suitable memory in each of the rootport 102 and endpoint 104 can contain saved parameter coefficients from a previous equalization training cycle.

Each of the exemplary rootport 102 and endpoint 104 devices contain configuration registers that hold condition bits or flags to support fast link training, as illustrated in Table 1. As illustrated in Table 1, embodiments of the invention can make use of the following exemplary flags, bits, and values: a 4-Part ID, an EL bit (Embedded Link bit), an EFC bit (Endpoint is Fast Link Training Capable bit), an RFC bit (Rootport is Fast Link Training Capable bit), and an HT bit (Has Trained bit).

TABLE 1

| | |
|---|---|
| 4-Part ID (READ-ONLY) | Allows identifying if device is the same as previously trained. Rootport is expected to check this cached info (e.g. firmware hard-code or non-volatile memory) |
| EL: Embedded Link (READ-ONLY) | Rootport to Endpoint interconnect is comprised of an embedded link (soldered-down or fixed connector) which naturally has consistent characteristics, and for which previous working characteristics should be firstly re-attempted. Implies the Rootport should start in Gen 1 and probe Endpoint to determine FLT capability. Note: fast link training process may additionally be applied to other cases, even without this capability flag. |
| EFC: Endpoint is Fast Link Training Capable (READ-ONLY) | Endpoint is capable of supporting fast link training protocol. Implies reusing last known working equalization settings, as well as accepting equalization settings instead of presets. |
| RFC: Rootport is Fast Link Training Capable (READ/WRITE) | Defaults to Zero. Cleared by Endpoint on Reset, and Rootport sets after PCIe Gen 1 reading Config. Indicates the Rootport has determined both Upstream/Downstream are FLT capable. Note: Endpoint Transmitter will not attempt to apply FLT to the path to Rootport TX until this bit is set. |
| HT: Has Trained (READ/WRITE) | Default is Zero. Retained in non-volatile storage. Endpoint already trained once and has derived |

TABLE 1-continued working equalization settings.
Set by endpoint after first successful full link training.
Reset by Rootport if adapter-system Config changed,
or if forcing re-training (link degradation scenario).
Note: Rootport should have similar internal state
Reg & Non-volatile storage.

In one embodiment, both the rootport 102 and the endpoint 104 can determine (through their respective register bits and flags) that they have talked to each other and that they both have settings for fast link training. In other words, because while a device may have talked to a same kind of device, if the previous device was removed and a new, same device was replaced, the same kind of endpoint, for example, would not determine that a previous device had already talked to the rootport and equalization training would need to be completed in full.

Generally, once a device has been paired with another device on a PCIe link, those two devices will not be unpaired, especially in a laptop where the components traditionally will stay the same during its operational lifetime. Even with a desktop system, where a user can install a different graphics card or rootport chip, while the new device will not have the full information and full equalization training will be required, the capability bits and flags can be set and the selected optimal parameters saved for the next time the two devices need equalization training.

In one embodiment, fast link training uses conventional equalization training, while substituting a saved set of parameter coefficients for the rootport 102 and endpoint 104 instead of the rootport 102 and endpoint 104 searching for optimal parameter coefficients with the accompanying time delay required for finding the optimal parameters. In one embodiment of fast link training, the first two phases of equalization training, Phase 0 and Phase 1 are completed as normal, such that default preset parameter coefficients are set for the rootport 102 and endpoint 104 transmitters, while the rootport 102 and endpoint 104 receivers are also partially trained. However, once Phase 0 and Phase 1 are completed, instead of going into the conventional process of searching for optimal parameter coefficients, previously saved parameter coefficients are used. For example, in Phase 2, the endpoint transmitter can request the rootport transmitter to change its parameter settings to a particular set of parameter coefficients that were saved by the endpoint device 104. In other words, the endpoint 104 already knows what the optimal rootport transmitter parameter settings should be as they were saved from a previous equalization training cycle and simply requests the rootport transmitter to use those parameter coefficients rather than spending the time cost of searching for an optimal set of parameter coefficients. Similarly in Phase 3, the rootport 102 transmitter will request the endpoint 104 transmitter to change its parameter settings to a particular set of parameter coefficients that were saved by the rootport device 102.

As such, fast link training is an improvement on the PCI SIG (PCI Special Interest Group) specifications. According to the specification, the rootport 102 and endpoint 104 are required to request what parameter changes they want to see for the other's transmitter. The rootport 102 and endpoint 104 are able to request any set of parameters they desire (whether the selected set is one of a hundred different combinations that will be cycled through while trying to find an optimal set, or only a single set of parameter coefficients). Therefore, while following the specification, the endpoint 104 can know what transmitter parameter settings are needed for the rootport 102, and the rootport 102 can know what transmitter parameter settings are needed for the endpoint 104 and request them.

Fast link training makes use of the analysis specifications for full conventional equalization training (especially in Phases 2 and 3) to ensure that the saved optimal parameter settings are working for the rootport 102 and endpoint 104. In other words, rather than cycling through a variety of parameter sets and evaluating each of them during a search for an optimal set of parameters, previously determined optimal parameters are set and evaluated to ensure that they are still below a designated error rate. Further, embodiments of the rootport 102 and endpoint 104 will have adaptive abilities, such that even if the optimal parameters have shifted some, the shift may not be outside of the device's adaptability, which would require the selection of new optimal parameters (and the required equalization training).

In another embodiment of the present invention, rather than starting with a set of default presets followed by the requesting of saved optimal parameters in Phases 2 and 3, the saved optimal parameters can optionally be used in Phases 0 and 1 instead of the default presets. By using the optimal parameter coefficients right at the start, at least one of the phases could be optionally omitted and the fast link training cycle ended even earlier than before. A benefit of using the optimal parameters instead of the default presets is that during those early phases (Phase 0 and Phase 1), the receivers of the rootport 102 and endpoint 104 are going through training themselves, which will have to be repeated when the optimal parameters are substituted for the default presets.

Requesting the saved optimal parameters right from the start rather than requesting default presets and then optimal parameters in sequence, the training process can be further simplified with receiver training of the rootport 102 and endpoint 104 only required once. In one embodiment, if you have used the optimal parameters in Phase 0 and Phase 1, then you could potentially skip Phases 2 and 3. In other words, any training that takes place in Phases 0 and 1 takes place with the optimal parameters so at the completion of Phase 1, the training could potentially be finished and running Phases 2 and 3 would be unnecessary and redundant. Fast link training that utilizes the optimal parameters right from the start could reduce the phases of equalization training to nothing more than a synchronization process. When starting with optimal parameters in Phases 0 and 1, both devices will need to know the optimal parameters for each of them, since they will need to have the proper transmitter parameters right from the start so that training in the first two phases can be performed using the saved optimal parameters. In other words, the device requesting a speed change will use the optimal parameters and request the transmitter of the opposite device to use the specified set of optimal parameters for its transmitter.

As noted above, when the rootport 102 and/or endpoint 104 attempt to use previously saved optimal parameters and an analysis reveals that the PCIe Gen3 link is not adequate for data traffic, in one embodiment the fast link training will be halted. Such a condition may occur when the saved parameters have been corrupted or if the optimal parameters needed by the rootport 102 and/or endpoint 104 have shifted enough that the receiver adaptability of the rootport 102 and/or endpoint 104 are unable to adjust sufficiently. In other words, should receiver adaptability be sufficient to correct increased error rate, then fast link training may continue, otherwise fast link training will have to halt. Once the fast link training as been halted, the condition flags are reset and the PCIe link is returned to PCIe Gen1/Gen2 link speeds. As in the example above, when fast link training fails with the saved parameter coefficients, to return to PCIe Gen3 speeds, full equalization training must be performed. In one embodiment, conventional, autonomous equalization training may be performed.

In another embodiment, rather than conventional or full equalization training, burst link training, as discussed by Hopgood incorporated above, can be performed. Hopgood describes a method for breaking down conventional equalization training into smaller intervals of partial training, interspersed with data transactions that helps address the implicit risks of training, as well as allowing data to continue to flow, while the optimal link speed is achieved. While the overall process described by Hopgood can take longer than what occurs with conventional full link training, because training bursts can be interleaved with bus idle conditions, and with normal data transactions still being completed, the process is not critically intrusive to normal system operation. After equalization training is performed, the condition flags in the register as well as the new saved optimal parameters will allow the rootport 102 and endpoint 104 to make use of fast link training during a subsequent training cycle.

Figure 5:
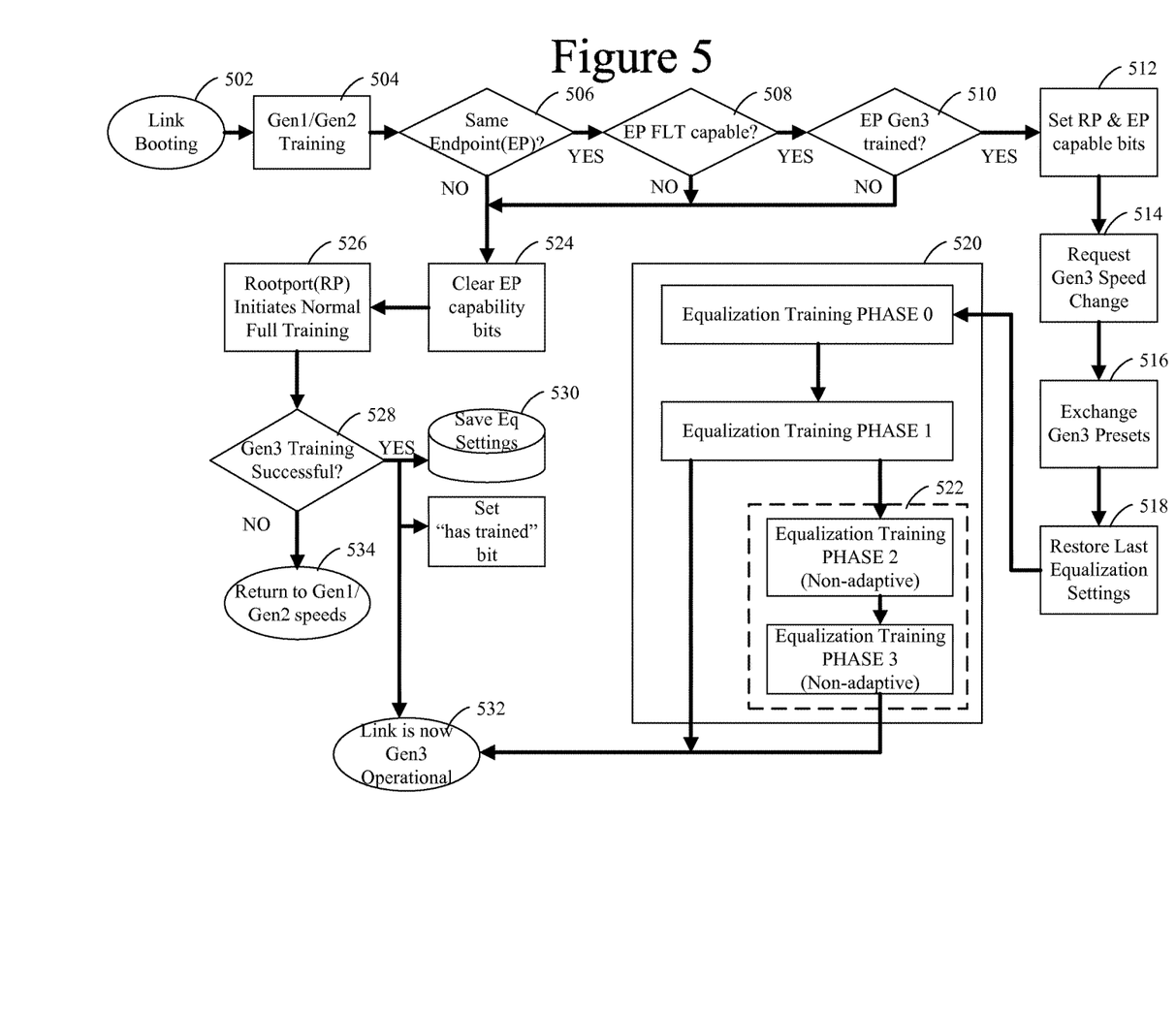
FIG. 5 illustrates an exemplary flow diagram for performing equalization training using fast link training methods in accordance with an embodiment of the present invention.

An exemplary process for fast link training is illustrated in FIG. 5. As illustrated in FIG. 5, in step 502, a PCIe link is booted. As noted above, such link booting may take place during an initial system boot or during a subsequent reboot of the link after the link was powered-down. In step 504, PCIe Gen1/Gen2 link training is completed. As noted above, PCIe Gen1/Gen2 can usually be performed without notice by the user and/or system. In steps 506, 508, and 510, evaluations are performed to determine: whether the endpoint 104 is known to the rootport 102 (by reading the 4-Part ID of the endpoint), whether the endpoint 104 is fast link training capable (by reading the EFC bit), and whether the endpoint 104 has been previously trained at PCI Gen3 speeds (by reading the HT bit), respectively. In step 512, the endpoint 104 sets the RFC bit indicating that the rootport 102 and endpoint 104 are fast link training capable.

In step 514, a request is made by either the rootport 102 or endpoint 104 to switch to PCIe Gen3 speeds. In step 516, the rootport 102 and endpoint 104 exchange Gen3 presets. As discussed above, rather than the exchange of presets, optionally the rootport 102 and endpoint 104 can exchange saved optimal parameters at this time. In step 518, saved parameter coefficients from a previous equalization training cycle are accessed and applied in step 520. In step 520, equalization training occurs, however, rather than going through the conventional search for optimal parameters in Phases 2 and 3, saved parameters, which were optimal parameters from a previous successful equalization training cycle, are used in Phases 0 and 1 instead. As illustrated in step 520, and discussed above, equalization training may be performed with the saved optimal parameters substituting for the presets and thereby allowing Phases 2 and 3 to not be performed. In another embodiment, in step 522, the saved parameters can be substituted for the presets and Phases 2 and 3 gone through without making any changes. In a further embodiment, the presets may be used in Phases 0 and 1, with the saved optimal parameters used in Phases 2 and 3. With the completion of step 520 (and optionally 522), the PCIe link is now fully trained and Gen3 operational in step 532.

If it is determined that the endpoint 104 is not known to the rootport 102, or the endpoint 104 is not fast link training capable, or the endpoint 104 has not previously been trained to PCIe Gen3, then in step 524, endpoint 104 capability bits are cleared (assuming the endpoint 104 is fast link training capable and has such capability bits). In step 526, the rootport initiates conventional full equalization training. In step 528, it is determined whether or not PCIe Gen3 equalization training was completed successfully. If training was completed successfully, then in step 530, the selected, optimal parameter coefficients are saved and the endpoint HT bit is set. In step 532, the training was completed successfully and the PCIe link is Gen3 operational. As discussed above, when PCIe Gen3 training does not complete successfully, the PCIe link is dropped back to Gen1/Gen2 speeds.

In one embodiment, when it has been determined that the saved optimal parameters are no longer optimal and need to be replaced, the system may respond in one of several ways. In one embodiment, when the fast link training cycle has failed, the PCIe link is returned to PCIe Gen1/Gen2 speeds so that data traffic can be handled. Thereafter, when the rootport 102 or endpoint 104 requests a return to PCIe Gen3 speeds, a full equalization training cycle is required. As discussed above, the system can perform either full equalization training, or burst link training as discussed by Hopgood. A primary consideration is that the length of time that the PCIe link is unavailable for data traffic handling will be kept to a minimum. In other words, it may be better to transmit data at a slower speed (PCIe Gen1/Gen2) rather than intolerably delay data traffic while attempting to re-establish a trained PCIe Gen3 speed connection. In another embodiment, when the fast link training cycle has failed, the PCIe link may remain at the higher untrained speed and attempt to complete equalization training. In a further embodiment, the equalization training attempted is Hopgood's burst link training.

In another embodiment, only one of the devices is capable and/or ready to perform fast link training. In such an exemplary embodiment, if only the endpoint 104, for example, was able to perform fast link training, then only the endpoint 104 will directly request saved optimal parameters for the rootport transmitter. While only one of the two devices was able to perform fast link training, it will still reduce the equalization training time required since only the non-capable device will be required to search for the optimal parameter coefficients.

Although certain preferred embodiments and methods have been disclosed herein, it will be apparent from the foregoing disclosure to those skilled in the art that variations and modifications of such embodiments and methods may be made without departing from the spirit and scope of the invention. It is intended that the invention shall be limited only to the extent required by the appended claims and the rules and principles of applicable law.

What is claimed is:

1. A system comprising:
   a first device and a second device;
   a communications link; and
   a memory, wherein the memory stores instructions that when executed by the system perform a method of communications link training, the method comprising:
   requesting a speed change to a second speed for the first device communicating with the second device at a first speed via the communications link;
   accessing a saved set of parameters for at least one of the first device and the second device; and
   performing a first training cycle for the first device and the second device at the second speed using the saved set of parameters for the at least one of the first device and second device, wherein the saved set of parameters are established during a previous training cycle that precedes said first training cycle, wherein said previous training cycle is performed between a third device and one of said first device and said second device, wherein the saved set of parameters for the at least one of the first device and the second device are previously determined optimal parameters from the previous training cycle for the at least one of the first device and the second device, and wherein further said third device and said one of said first device and said second device are of a same type.

2. The system of claim 1, wherein said performing a first training cycle further comprises, halting the first training cycle at the second speed after a selected period of time and the first device resuming communicating with the second device via the communications link at the first speed.

3. The system of claim 1, wherein said performing a first training cycle further comprises, before completing the first training cycle at the second speed, when the error rate is above a threshold, the first device resuming communicating with the second device via the communications link at the first speed.

4. The system of claim 3, wherein said performing a first training cycle further comprises, after completing the first training cycle at the second speed, when the error rate is above a threshold, the first device resuming communicating with the second device via the communications link at the first speed.

5. The system of claim 4, wherein the method of communications link training further comprises:
performing a second training cycle for the first device and second device at the second speed.

6. The system of claim 1, wherein the data to be communicated between the first device and second device is stored in a buffer of one of the first and second devices during the first training cycle for the second speed.

7. The system of claim 1, wherein a training cycle comprises:
selecting a plurality of parameters for the first device when the saved set of parameters are for the second device; and
selecting a plurality of parameters for the second device when the saved set of parameters are for the first device.

8. A communications link training method comprising:
requesting a speed change to a second speed for a first device communicating with a second device at a first speed via the communications link;
accessing a saved set of parameters comprising an identification of at least one of the first device and the second device;
performing a first training cycle for the first device and the second device at the second speed using the saved set of parameters for the at least one of the first device and second device, wherein the saved set of parameters are established between a third device and one of said first device and said second device during a previous training cycle that precedes said first training cycle, wherein the saved set of parameters for the at least one of the first device and the second device are previously determined optimal parameters from the previous training cycle for the at least one of the first device and the second device, and wherein said third device and said one of said first device and said second device are of a same type.

9. The method of claim 8, wherein said performing a first training cycle further comprises, halting the first training cycle at the second speed after a selected period of time and the first device resuming communicating with the second device via the communications link at the first speed.

10. The method of claim 8, wherein said performing a first training cycle further comprises, before completing the first training cycle at the second speed, when the error rate is above a threshold, the first device resuming communicating with the second device via the communications link at the first speed.

11. The method of claim 10, wherein said performing a first training cycle further comprises, after completing the first training cycle at the second speed, when the error rate is above a threshold, the first device resuming communicating with the second device via the communications link at the first speed.

12. The method of claim 11, further comprising:
performing a second training cycle for the first device and second device at the second speed.

13. The method of claim 8, wherein a training cycle comprises:
selecting a plurality of parameters for the first device when the saved set of parameters are for the second device; and
selecting a plurality of parameters for the second device when the saved set of parameters are for the first device.

14. A non-transitory computer readable media comprising computer-executable instructions stored therein, the computer-executable instructions comprising:
instructions to request a speed change to a second speed for a first device communicating with a second device at a first speed via a communications link;
instructions to access a saved set of parameters; and
instructions to perform a first training cycle for the first device and the second device at the second speed using the saved set of parameters for the at least one of the first device and second device, wherein the saved set of parameters are established between a third device and one of said first device and said second device during a previous training cycle that precedes said first training cycle, wherein the saved set of parameters for the at least one of the first device and the second device are previously determined optimal parameters from the previous training cycle for the at least one of the first device and the second device, and wherein said third device and said one of said first device and said second device are of a same type.

15. The non-transitory computer readable media of claim 14, wherein said instructions to perform a first training cycle further comprises, before completing the first training cycle at the second speed, when the error rate is above a threshold, the first device resuming communicating with the second device via the communications link at the first speed.

16. The non-transitory computer readable media of claim 15, wherein said instructions to perform a first training cycle further comprises, after completing the first training cycle at the second speed, when the error rate is above a threshold, the first device resuming communicating with the second device via the communications link at the first speed.

17. The non-transitory computer readable media of claim 14, wherein a training cycle comprises:
instructions to select a plurality of parameters for the first device when the saved set of parameters are for the second device; and instructions to select a plurality of parameters for the second device when the saved set of parameters are for the first device.

* * * * *